US012777021B2

(12) United States Patent
Wu et al.

(10) Patent No.: US 12,777,021 B2
(45) Date of Patent: Oct. 27, 2026

(54) SECURE ASSOCIATION SHARING IN MULTI-SOURCE AND MULTI-DESTINATION ENVIRONMENTS

(71) Applicant: Cisco Technology, Inc., San Jose, CA (US)

(72) Inventors: Wanli Wu, Sunnyvale, CA (US); Scott Roy Fluhrer, North Attleboro, MA (US)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 18/937,786

(22) Filed: Nov. 5, 2024

(65) Prior Publication Data

US 2026/0129030 A1 May 7, 2026

(51) Int. Cl.
*H04L 9/40* (2022.01)
*H04L 69/22* (2022.01)

(52) U.S. Cl.
CPC ............ *H04L 63/029* (2013.01); *H04L 69/22* (2013.01)

(58) Field of Classification Search
CPC .............................. H04L 63/029; H04L 69/22
USPC ............................................................ 726/11
See application file for complete search history.

(56) References Cited

U.S. PATENT DOCUMENTS 11,233,635 B1 1/2022 Gordon
2007/0160052 A1* 7/2007 Okada ................. H04L 45/7453 370/392
2015/0172091 A1* 6/2015 Che ....................... H04L 45/742 370/392
2016/0014098 A1 1/2016 Wakumoto et al.
2021/0314351 A1 10/2021 Mozumdar et al.

FOREIGN PATENT DOCUMENTS

CN 109997335 A * 7/2019 ........... H04L 43/026
KR 20070059894 A 6/2007
TW 1381334 B * 1/2023

OTHER PUBLICATIONS

"Security Configuration Guide," Cisco IOS XE Amsterdam 17.3.x (Catalyst 9200 Switches), Jul. 31, 2020, 690pages.

* cited by examiner

*Primary Examiner* — Jacob Lipman
(74) *Attorney, Agent, or Firm* — Lee & Hayes, P.C.

(57) ABSTRACT

This disclosure describes techniques and mechanisms for providing initialization vector (IV) uniqueness and extending rekeying windows for network devices that perform secure association sharing in multi-source and multi-destination environments. The techniques may apply to existing hardware of the network devices. The techniques may enable the network devices to execute in a non-XPN mode and establish secure tunnels corresponding to secure association sessions. The techniques may utilize software to partition extra bits included in packet headers. The network devices may perform a process to update a loop count value utilizing a portion of the extra bits, thereby exponentially extending the rekeying windows. Further, by utilizing a portion of the extra bits, the system may ensure IV uniqueness for the secure association session between network devices in the multi-source and multi-destination environment.

18 Claims, 6 Drawing Sheets

SECURE ASSOCIATION SHARING IN MULTI-SOURCE AND MULTI-DESTINATION ENVIRONMENTS

TECHNICAL FIELD

The present disclosure relates generally to the field of computer networking, and more particularly to utilizing hardware and software to provide initialization vector (IV) uniqueness and extend secure association re-keying windows in multi-source and multi-destination environments.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches may allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

An example network may be a cloud network, a data center interconnect (DCI) network, and/or a multi-source and multi-destination network. In such networks, tunnels may be utilized to communicate between network devices. For security, tunnel security protocols such as MACSEC or any other security protocol may be used to secure a tunnel.

However, existing tunnel security protocols have some limitations. A first limitation relates to secure authentication (SA) sharing between different network devices in the multi-source and multi-destination environments. For instance, existing network devices have limited SA table sizes, such that the size of the SA table may limit scalability of the entire network. Moreover, SA sharing in such environments may be performed using specific hardware modes of the network devices, resulting in shortened rekeying windows.

Another limitation relates to encryption protocols used on traffic in the secure tunnels. In particular, existing tunnel security protocols may use initialization vectors (IVs) for encryption during SA sessions, where the IVs are not supposed to be reused for encrypting data, as reuse of the IV may introduce security vulnerabilities to the network. However, with existing hardware and the volume of data being transmitted in the SA session, rekeying windows are short, resulting in network devices having to rekey the IVs at a high rate, thereby consuming more resources on the network device and within the network, and resulting in a greater chance that an IV may be reused or a similar IV may be generated, which can result in security vulnerabilities to the network.

Accordingly, there is a need for a simplified way to improve IV uniqueness, extend SA rekeying windows, and improve scalability that can be applied to existing hardware in networks and does not require changes to existing protocols.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
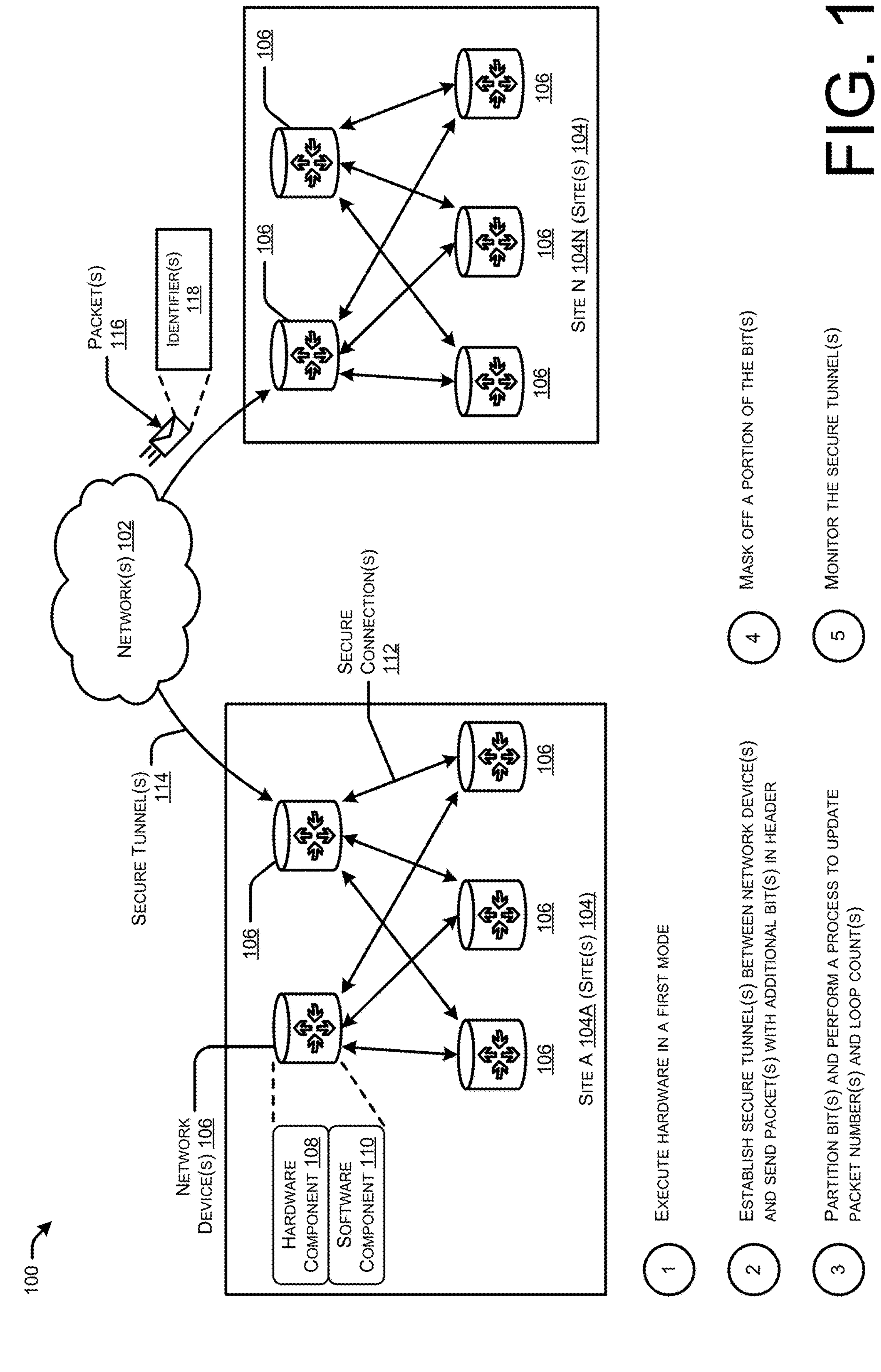
FIG. 1 illustrates a system-architecture diagram of an environment in which a system can ensure initialization vector (IV) uniqueness and extend secure association rekeying windows in multi-source and multi-destination environments.

The present disclosure relates generally to the field of computer network security, and more particularly to utilizing hardware and software to provide initialization vector (IV) uniqueness and extend secure association rekeying windows in multi-source and multi-destination environments.

A method to perform the techniques described herein may be implemented at least in part by a network device of a network and may include establishing a secure tunnel with a security engine in the network, wherein the network device receives packets via the secure tunnel, the packets comprising an identifier of the security engine. The method may include setting, based on establishing the secure tunnel, a loop count value to a first initial value and a packet number value to a second initial value. Further the method may include masking, based on the identifier and in a first memory, an upper portion of bits in packet headers of the packets Additionally, the method may include updating the loop count value in the first memory based at least in part on: determining that the packet number value is greater than a threshold value; updating, based on the determining, the packet number value to a specialized value; incrementing, based on updating the packet number, the loop count value; and setting, based on incrementing the loop count value, the packet number value to the first initial value.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

EXAMPLE EMBODIMENTS

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches may allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

An example network may be a cloud network, a data center interconnect (DCI) network, and/or a multi-source and multi-destination network. In such networks, secure tunnels may be utilized to communicate between network devices.

For security, tunnel security protocols such as MACSEC (or other forms of tunnel security protocols based on MACSEC the protocol) may be used to secure a tunnel. However, existing tunnel security protocols have some limitations. A first limitation is secure association (SA) sharing. Without SA sharing in multi-source and multi-destination environment, a system may need to maintain total SA sessions equal to M×N in one direction, where "M" is the number of senders (e.g., network device(s), transmitting engine(s), etc.) and "N" is the number of receivers (e.g., network devices, receiver engine(s), etc.). However, maintaining and rekeying the M×N sessions is resource intensive and challenging to maintain by the software of the network devices.

Moreover, without SA sharing in multi-source and multi-destination environments, each receiver device may need create a SA with each sender device, which is stored in an SA table of the receiver device. However, the receiver device, and thus the system, is then limited to the size of the SA table. Thus, a receiver with minimal SA table size may limit the scalability of the entire system (e.g., network). For example, a network device, such as a security engine in a network may comprise a 100G engine with a SA table size of 256 entries (or less). Thus, the total number of entries in the SA table of a sender network device may be limited to less than 256 entries, such as where there is portion of the SA table allocated for rekeying). This introduces a big scaling limitation in DCI networks or cloud networks.

Accordingly, SA sharing can be used to address the above challenges in a multi-destination and multi-source environment. For instance, with SA sharing, all the security engines (senders and receivers) can a share single SA in the entire DCI or cloud network. However, SA sharing also introduces new challenges.

A first challenge is, with SA sharing and using tunnel security protocols, XPN mode of network devices is unable to be used. This is due to due to un-even traffic distribution, receiver engine may not able recover the XPN high 32 bits, which leads to the network device being unable to successfully decrypt the traffic. Accordingly, network devices may utilize a non-XPN mode. However, in non-XPN mode, rekeying windows are short, resulting in high rates of rekeying, thereby consuming more resources on the network device and within the network, and resulting in a greater chance that an IV may be reused or a similar IV may be generated, which can result in security vulnerabilities to the network. Further, the non-XPN mode standard was originally established for single transmitter and single receiver environments and uses an upper 32 bits for internal security processing. However, in multi-destination and multi-source environments, synchronizing the upper 32 bits between all of the transmitter engines and receiver engines is difficult and resource intensive.

A second challenge relates to initialization vector (IV) uniqueness. In particular, tunnel security protocols may use Galois counter mode (GCM) and/or variations of GCM (e.g., GCM-AES, etc.) to protect data being transmitted. With GCM, it is mandatory different pieces of data are encrypted with different nonces and keys. To accomplish this, GCM utilizes initialization vectors (IVs). The primary purpose of the IV is to be a nonce, that is, to be distinct for each invocation of the encryption operation for a fixed key. Thus, under existing security tunnel protocols, an IV is not supposed to be reused for encryption during a single SA session, as reuse of the IV may introduce security vulnerabilities to the network.

However, in multi-source and multi-destination environments, ensuring that encrypted traffic from different transmitting network devices do not reuse any IV is difficult due to the sheer volume of traffic being sent and multiple senders and receivers being utilized. Accordingly, IVs may ultimately be reused such that security vulnerabilities can be introduced to the network.

Accordingly, there is a need for a simplified way to improve IV uniqueness, extend SA rekeying windows, and improve scalability that can be applied to existing hardware in networks and does not require changes to existing security protocols.

This disclosure describes techniques and mechanisms for improving scalability, ensuring initialization vector (IV) uniqueness, and extending SA rekeying windows in multi-source and multi-destination environments. In some examples, the system may establish a secure tunnel with a security engine in the network, wherein the network device receives packets via the secure tunnel, the packets comprising an identifier of the security engine. The system may set, based on establishing the secure tunnel, a loop count value to a first initial value and a packet number value to a second initial value. In some examples, the system may mask, based on the identifier and in a first memory, an upper portion of bits in packet headers of the packets. They system may update the loop count value in the first memory based at least in part on: determining that the packet number value is greater than a threshold value; updating, based on the determining, the packet number value to a specialized value; incrementing, based on updating the packet number, the loop count value; and setting, based on incrementing the loop count value, the packet number value to one.

In some examples, the system may comprise a hardware component. The hardware component may be implemented in the hardware of a network device (e.g., such as a transmitter security engine, a receiver security engine, etc.) of the network. In some examples, the hardware component may be configured to cause the network device to execute in non-XPN mode. The hardware component may cause the network device to enable the secure channel (SC) bit in the security tunnel protocol header (e.g., such as the MACSEC header) TCI byte, such that the security tunnel protocol header may be extended to carry an extra 64 bits in the secure channel identifier (SCI) value.

In some examples, the hardware component may comprise memory. The memory may store packet number (PN) value(s) (e.g., respective value(s) may be allocated as 32 bits in memory), SCI value(s), and/or loop count value(s) associated with SA sessions. In some examples, an SA session corresponds to a secure tunnel formed between network device(s) (e.g., such as multiple transmitter security engines and multiple receiver security engines).

In some examples, the hardware component may be configured to monitor the PN value(s). For instance, the hardware component may monitor the PN value(s) for each secure tunnel (e.g., SA session) between network devices. The hardware component may determine that the PN value for a tunnel is reaching, meets, or exceeds a threshold value. The threshold value may correspond to a preset value by a network administrator. In some examples, the hardware component may send a notification to a software component of the network device based on determining the PN value is reaching, meeting, or exceed the threshold value.

In some examples, the hardware component is configured to mask off a portion of the SCI bits. For instance, the hardware component may be configured to mask the upper 48 bits of the SCI bits, such that the upper portion is set to "don't care" value for a secure session lookup. Accordingly, the lower 16 bits can be used to identify a SA session by a receiving security engine.

In some examples, the system may comprise a software component. In some examples, the software component may be configured to use a lower portion of the extra 64-bit SCI value (e.g., such as the lower 16 bits of the SCI or any suitable number of bits) to carry a sorted SCI value (SSCI). The software component may then partition the remaining 48 bits of the SCI value into two parts. A first part may comprise n bits configured to transmit an identifier of a network device (e.g., an engine ID). In some examples, the "n" bits that transmit the identifier may be used to ensure IV uniqueness. A second part may comprise the remaining bits (e.g., 48-n bits), which may be used by the software component when executing a process to update a loop count value. The loop count value may correspond to a number of times the 32-bit PN value is reset from a high value (e.g., the value that exceeds the threshold value) to an initial value (e.g., such as "1"). In some examples, the bits allocated for the loop count processing may extend the SA rekeying window by up to 2(48-n) times. For instance, a network device corresponds to a 100G security engine. In this example, the software component may allocate 16 bits for the identifier and 32 bits may be used for the process to update the loop count value. Accordingly, the rekeying window may equate to thousand(s) of years. It is understood that 16 bits for the identifier is an example and that any number of bits may be allocated by the software component (e.g., 10 bits, 24 bits, or any number less than 48 bits).

In this way, the system may provide a way to extend rekeying windows, ensure IV uniqueness in multi-source and multi-destination environments. That is, in contrast to existing techniques, which may require updates or changes to hardware on the network devices and/or tunnel security protocols, the techniques described herein can be applied to existing network devices and utilize existing hardware and security tunnel protocols of network devices. By utilizing the non-XPN mode with the SC bit enabled, the system can enable the security tunnel protocol to carry extra bits in the SCI value. These extra bits used such that the lower 16 bits stores the SSCI value and the upper 48 bits can be partitioned and used to extend the rekeying window and ensure IV uniqueness. For instance, the instant techniques may prevent rekeying from being needed in a SA session altogether and/or greatly reduce the frequency that rekeying occurs. Further, by masking the upper 48 bits in the SCI, the system can ensure that only the lower 16 bits are used to identify a SA session. Accordingly, in contrast to existing techniques, masking in hardware and updating of loop count values and packet numbers can occur simultaneously, improving the operation of the network devices.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can provide initialization vector (IV) uniqueness and extend secure association rekeying windows in multi-source and multi-destination environments. It is understood that any of the components of the system may be implemented on any device in the network 102.

In some examples, the system 100 may include a network 102 that includes network device(s) 106. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), RA VPNs, VPNs, ZTNA, Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The network device(s) 106 may comprise routers, switches, access points, stations, radios, and/or any other network device. In some examples, the network device(s) 106 may correspond to security engine(s) within the network 102. For instance, the network device(s) 106 may correspond to one or more transmitter security engine(s) and/or receiver security engine(s).

In some examples, the network device(s) 106 may comprise a hardware component 108. The hardware component 108 may be implemented in the hardware of a network device (e.g., such as a transmitter security engine, a receiver security engine, etc.) of the network. In some examples, the hardware component may be configured to cause the network device to execute in non-XPN mode. The hardware component may cause the network device to enable the secure channel (SC) bit in the security tunnel protocol header (e.g., such as the MACSEC header) TCI byte, such that the security tunnel protocol header may be extended to carry an extra 64 bits in the secure channel identifier (SCI) value.

In some examples, the hardware component 108 may comprise memory. The memory may store packet number (PN) value(s) (e.g., respective value(s) may be allocated as 32 bits in memory), SCI value(s), and/or loop count value(s) associated with SA sessions. In some examples, an SA session corresponds to a secure tunnel formed between network device(s) (e.g., such as multiple transmitter security engines and multiple receiver security engines).

In some examples, the hardware component 108 may be configured to monitor the PN value(s). For instance, the hardware component may monitor the PN value(s) for each secure tunnel (e.g., SA session) between network devices. The hardware component may determine that the PN value for a tunnel is reaching, meets, or exceeds a threshold value. The threshold value may correspond to a preset value by a network administrator. In some examples, the hardware component may send a notification to a software component of the network device based on determining the PN value is reaching, meeting, or exceed the threshold value.

In some examples, the hardware component 108 is configured to mask off a portion of the SCI bits. For instance, the hardware component 108 may be configured to mask the upper 48 bits of the SCI bits, such that the upper portion is set to “don’t care” value for a secure session lookup. Accordingly, the lower 16 bits can be used to identify a SA session.

In some examples, the network device(s) 106 may comprise a software component 110. In some examples, the software component may be configured to use a lower portion of the extra 64-bit SCI value (e.g., such as the lower 16 bits of the SCI or any suitable number of bits) to carry a sorted SCI value (SSCI). The software component may then partition the remaining 48 bits of the SCI value into two parts. A first part may comprise n bits configured to transmit an identifier of a network device (e.g., an engine ID). In some examples, the “n” bits that transmit the identifier may be used to ensure IV uniqueness. A second part may comprise the remaining bits (e.g., 48-n bits), which may be used by the software component when executing a process to update a loop count value. The loop count value may correspond to a number of times the 32-bit PN value is reset from a high value (e.g., the value that exceeds the threshold value) to an initial value (e.g., such as “1”). In some examples, the bits allocated for the loop count processing may extend the SA rekeying window by up to $2^{(48-n)}$ times. For instance, a network device corresponds to a 100G security engine. In this example, the software component may allocate 16 bits for the identifier and 32 bits may be used for the process to update the loop count value. Accordingly, the rekeying window may equate to thousand(s) of years. It is understood that 16 bits for the identifier is an example and that any number of bits may be allocated by the software component (e.g., 10 bits, 24 bits, or any number less than 48 bits). As described in greater detail below, the software component 110 may be configured to perform a process to update the loop count.

In some examples, the system 100 comprises site(s) 104 (e.g., Site A 104A, Site N 104N, etc.) that are configured to communicate with the network 102, network device(s) 106, etc. In some examples, the site(s) 104 comprise one or more engine(s), server(s), enterprise network(s), and/or service(s) associated with a service provider, one or more network device(s), etc. In some examples, the site(s) 104 correspond to one or more data center(s) comprising various network components, such as, for example, network switch(es) (also referred to as node(s)) operating on physical servers. In some examples, the site(s) 104 may comprise physical server(s) that may host one or more virtual machines. Each virtual machine may be configured to execute one of various operations and act as one or more virtual components for the cloud network(s) and/or enterprise/application network. In some examples, the physical server(s) may host any number of virtual machines. In some examples, the physical server(s) in the enterprise/application network may host the various network components of the enterprise/application network.

In some examples, the network device(s) 106 within each site (e.g., such as site A 104A) may be configured to communicate using secure connection(s) 112. In some examples, the secure connection(s) 112 may correspond to a secure tunnel protocol, such as MACSEC (or any other secure tunnel protocol). In some examples, the network device(s) 106 may be configured to form secure tunnel(s) 114 with network device(s) 106 at separate site(s) 104. For instance, a network device at site A 104A may form a secure tunnel 114 with a network device at site N 104N. In some examples, the secure tunnel 114 may be configured to utilize a secure tunnel protocol, such as MACSEC, CLOUDSEC, etc. In some examples, the secure tunnel 114 may correspond to a SA session.

As illustrated, the network device(s) 106 may be configured to communicate via network(s) 102. For instance, the network device(s) 106 may send packet(s) 116. The packet(s) 116 may correspond to packet(s) generated based on the secure tunnel protocol. For instance, the packet(s) 116 may represent a MACSEC packet. In some examples, the packet(s) 116 may comprise an identifier 118. For instance, the identifier 118 may be stored in an upper portion of the SCI value in the header of the packet 116 and may identify the network device (e.g., such as an engine ID of a transmitter engine, etc.).

At "1", the system may execute hardware in a first mode. For instance, the system may execute the hardware using hardware component 108. In some examples, the system may execute in a non-XPN mode.

At "2", the system may establish secure tunnel(s) between network device(s) and send packet(s) with additional bit(s) in the header(s). For instance, the system may establish a secure tunnel between network device(s) 106 at different site(s) 104, within the same site, etc. In some examples, the secure tunnel(s) may utilize a tunnel security protocol, such as MACSEC, CLOUDSEC, etc. As noted above, the secure tunnel(s) comprise level 2 multi-source and multi-destination tunnel(s).

At "3", the system may partition the bit(s) and perform a process to update packet number(s) and loop count(s). For instance, the system may partition the bit(s) using software component 110. As described above, the system may use the lower 16 bits of the SCI to store the SSCI value. The upper 48 bits may then be partitioned. A first portion of the upper 48 bits may be used to store an identifier of the network device (e.g., an engine ID). A second portion may then be used in the process to update the loop count value.

At "4", the system may mask off a portion of the bit(s). For instance, the masking may be performed by the hardware component 108. As noted above, the system may mask off the upper portion of the bit(s) (e.g., such as the upper 48 bits of the SCI bits), such that the lower 16 bits of the SCI bits can be used to identify a particular SA session.

At "5", the system may monitor the secure tunnel(s). For instance, one or more of the software component 110 or the hardware component 108 may monitor the PN value(s) associated with the secure tunnel(s). The system may update the PN value(s) and/or loop count value(s) as described in greater detail below.

Thus, the system may ensure uniqueness of IV's by using a uniqueness of an SCI value that is programmed by the software component 110. That is, the software component 110 may partition the SCI bits into three fields (e.g., engine ID, loop count, and SSCI). The system may use the SSCI to identify the secure channel of the SA session. The engine ID may be used to ensure uniqueness across all the transmitting security engines. The loop count may be used to extend the rekeying window. Further, by utilizing the software component 110 to perform updating of the loop count in hardware, while the system automatically updates the packet number in a separate hardware memory, the techniques described herein ensure there is no race condition between the hardware updating the PN memory and software update the SCI memory.

In this way, the system may provide a way to extend rekeying windows, ensure IV uniqueness in multi-source and multi-destination environments. That is, in contrast to existing techniques, which may require updates or changes to hardware on the network devices and/or tunnel security protocols, the techniques described herein can be applied to existing network devices and utilize existing hardware and security tunnel protocols of network devices. By utilizing the non-XPN mode with the SC bit enabled, the system can enable the security tunnel protocol to carry extra bits in the SCI value. These extra bits used such that the lower 16 bits stores the SSCI value and the upper 48 bits can be partitioned and used to extend the rekeying window and ensure IV uniqueness. For instance, the instant techniques may prevent rekeying from being needed in a SA session altogether and/or greatly reduce the frequency that rekeying occurs. Further, by masking the upper 48 bits of the SCI bits, the system can ensure that only the lower 16 bits are used to identify a SA session. Accordingly, in contrast to existing techniques, masking in hardware and updating of loop count values and packet numbers can occur simultaneously, improving the operation of the network devices.

Figure 2:
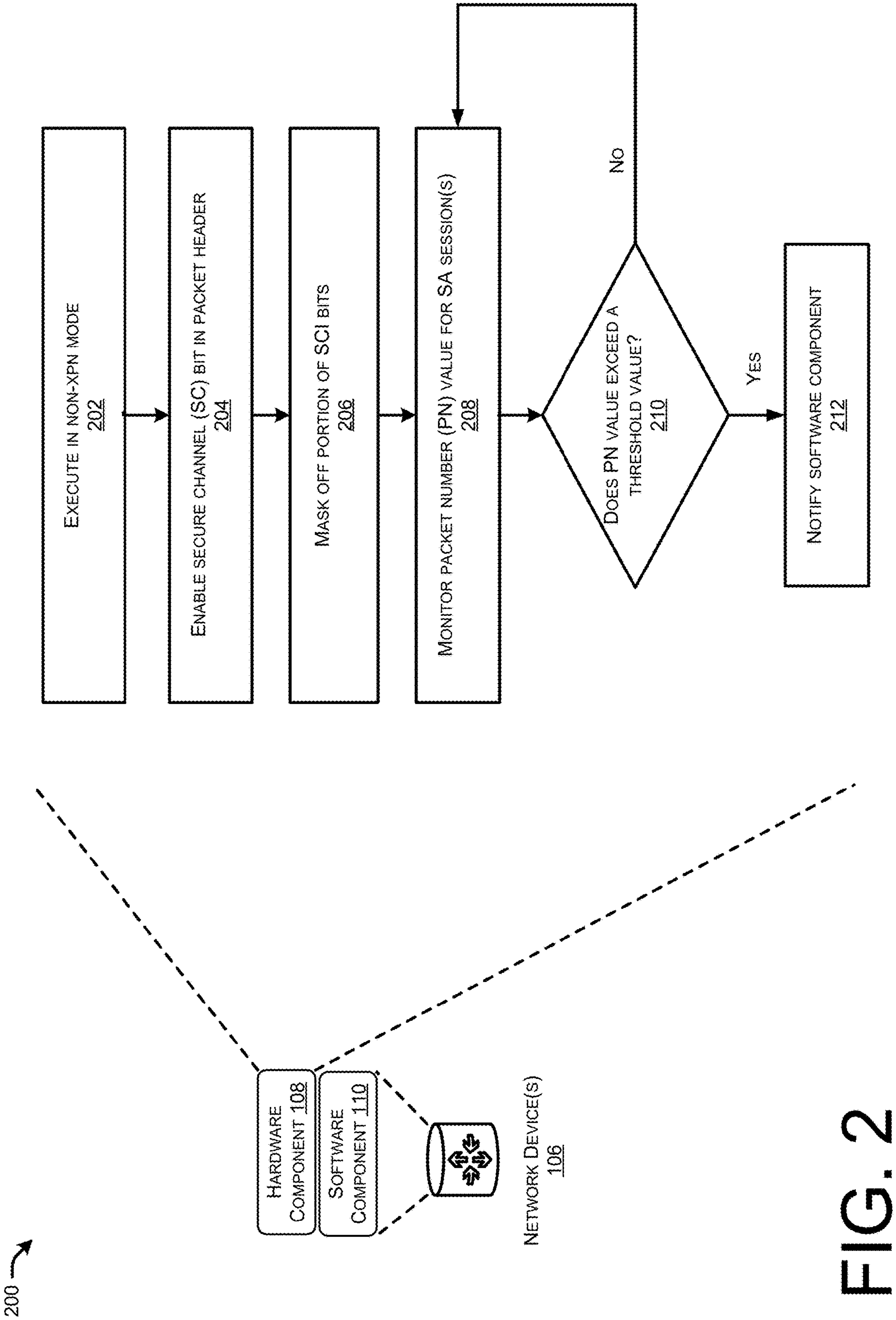
FIG. 2 illustrates an example environment showing exemplary processes of a hardware component associated with the system described in FIGS. 1 and 3.

FIG. 2 illustrates an example environment 200 showing exemplary actions that can be performed by the hardware component 108 of a network device 106, described in FIG. 1. In some instances, the hardware component 108 may be implemented as hardware on one or more computing devices in, or associated with, the network 102 (e.g., a single device or a system of devices), such as by network device(s) 106. In some examples, one or more steps illustrated in FIG. 2 may be performed in parallel with one or more of the steps illustrated in FIGS. 1 and 3. The steps illustrated in FIG. 2 are for example purposes only and are not meant to be construed as limiting. Additional or fewer steps may be performed. In some examples, one or more of the steps illustrated in environment 200 may be performed by the network device 106 at runtime and/or establishing a secure tunnel. As illustrated, the environment 200 may include network device(s) 106, hardware component 108, and software component 110.

At 202, the hardware component 108 may execute in a non-XPN mode. For instance, as noted above, when using security tunnel protocol(s), XPN mode is currently unavailable. This is due a receiving network device (e.g., such as a receiver engine) not being able to recover the XPN high 32 bits of traffic when there is uneven traffic distribution, such that it cannot successfully decrypt the traffic. Accordingly, the hardware component 108 may cause the network device to operate in non-XPN mode.

At 204, the hardware component 108 may enable a SC bit in packet header(s) of a TCI byte. For instance, the hardware component 108 may cause the network device to enable the secure channel (SC) bit in the security tunnel protocol header (e.g., such as the MACSEC header) TCI byte, such that the security tunnel protocol header may be extended to carry an extra 64 bits in the secure channel identifier (SCI) value.

At 206, the hardware component 108 may mask off a portion of the SCI bit(s). For instance, the hardware component 108 may be configured to mask an upper portion (e.g., such as the upper 48 bits, or any suitable number of bits) of the SCI bits in the headers. In some examples, the hardware component 108 may mask off the portion of the SCI bits to a "don't care" value for a secure session lookup. For instance, when a security engine (or other network device) receives a packet at the start of a SA session, the security engine may use the SCI value in the packet header to search its local programming to identify a secure session. The techniques described herein may request "don't care" bits associated with the upper portion of SCI bits during this secure session search process, which may be repurposed by the system. Thus, the system may then use the lower 16 bits (e.g., the unmasked portion of the SCI bits) to identify a SA session. In some examples, the hardware component 108 may mask off the portion of the SCI bits in parallel with step 308 of FIG. 3 below and/or in response to a secure tunnel being established.

At 208, the hardware component 108 may monitor packet number value(s) for SA session(s). For instance, the hardware component 108 may monitor the PN value(s) for each secure tunnel (e.g., SA session) between network devices. In some examples, the hardware component 108 may increment the PN value(s) as packet(s) are received via the secure tunnel.

At 210, the hardware component 108 may determine whether the PN value exceeds a threshold value. For instance, the hardware component 108 may determine that the PN value for a tunnel is reaching, meets, or exceeds a threshold value. The threshold value may correspond to a preset value by a network administrator. In some examples, the threshold value corresponds to a value that indicates the SA session will soon hit 4 billion packets. For instance, in non-XPN mode, 32 bits may be allocated for internal processing. The 32 bits may enable up to 4 billion packets (for example) to be sent during a SA session before rekeying may be needed. Accordingly, the PN value may indicate the number of packets sent during the SA session and the threshold value may indicate that the 32-bit limit is about to be reached.

Where the hardware component 108 determines the PN value does exceed the threshold value (210—YES), the process may proceed to step 212. At 212, the hardware component may notify a software component of the network device. For instance, the hardware component 108 may send a notification to the software component 110. The notification may indicate that the PN value exceeds the threshold value and/or that the loop count value needs to be incremented.

Where the hardware component 108 determines the PN value does not exceed the threshold value (210—NO), the process may return to step 208 and continue monitoring the PN value(s).

Figure 3:
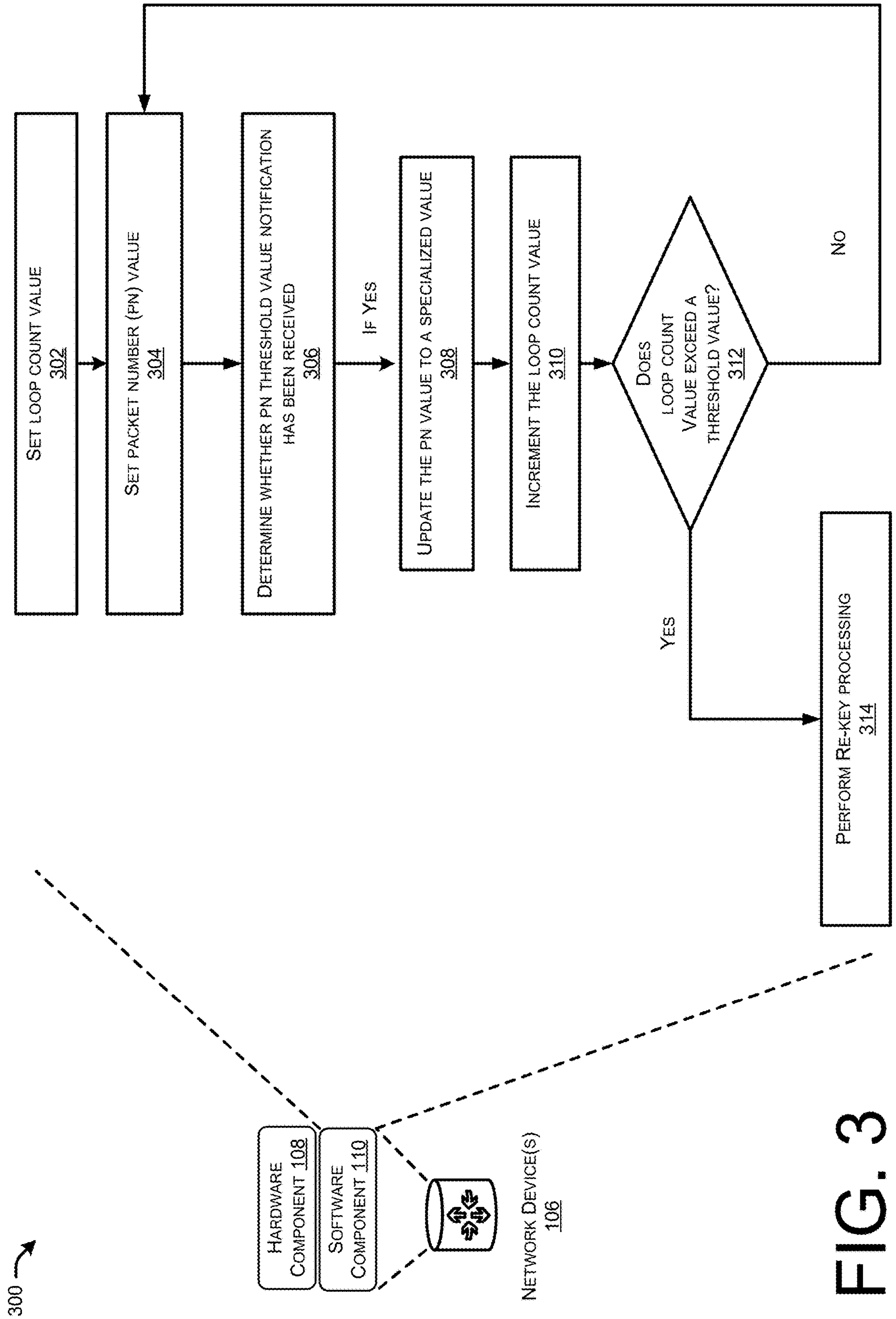
FIG. 3 illustrates an example environment showing exemplary processes of a software component associated with the system described in FIGS. 1 and 2.

FIG. 3 illustrates an example environment 300 showing exemplary actions that can be performed by the software component 110 of a network device 106, described in FIGS. 1 and 2. For instance, one or more of the steps illustrated in environment 300 may correspond to the process performed by the software component 110 to update the loop count value. In some examples, the steps illustrated in environment 300 may be performed in response to the network device 106 establishing a secure tunnel.

In some instances, the software component 110 may be implemented as software on a network device 106 (e.g., such as a security engine within the network 102). In some examples, one or more steps illustrated in FIG. 3 may be performed in parallel with one or more of the steps illustrated in FIGS. 1 and 2. The steps illustrated in FIG. 3 are for example purposes only and are not meant to be construed as limiting. Additional or fewer steps may be performed by the software component 110. As illustrated, the environment 300 may include the environment 300 may include network device(s) 106, hardware component 108, and software component 110.

At 302, the software component 110 may set a loop count value. For instance, the software component 110 may set the loop count value to an initial value (e.g., "0") at the start of a SA session and/or in response to a secure tunnel being formed. In some examples, the loop count value may be stored in a first memory of hardware of the network device. For instance, the loop count value may be stored in an SCI memory of the hardware. In some examples, the software component 110 may store a local copy of the loop count value in memory of the software component 110.

At 304, the software component 110 may set a packet number (PN) value. For instance, the software component 110 may set the PN value to an initial value (e.g., such as "1") in a memory of the hardware. In some examples, the PN value may be stored in a second memory of the hardware (e.g., such as a packet counter memory). In some examples, the first memory and the second memory may comprise separate memories. In some examples, the first memory and the second memory may comprise a same memory.

At 306, the software component 110 may determine whether a PN threshold notification is received. For instance, the software component may determine whether the PN threshold notification has been received from the hardware component 108.

Where the software component 110 determines that the PN threshold notification has not been received, the system may continue to wait for the PN threshold notification to be received.

Where the software component 110 determines that the PN threshold notification has been received (306—IF YES), the system may continue to step 308.

At 308, the software component 110 may update the PN value to a specialized value. For instance, the software component 110 may access a local copy of the loop count value. Where the software component 110 determines the current loop count value is an even number, the software component 110 may update and/or change the PN value to a first specialized value (e.g., such as "0xe0000000" or any other suitable value). Where the software component 110 determines the current loop count value is an odd number, the software component 110 may update and/or change the PN value to a second specialized value (e.g., such as "0xf0000000" or any other suitable value).

At 310, the software component 110 may increment the loop count value. For instance, the loop count value may be stored in a second memory of the hardware (e.g., SCI memory). Accordingly, the software component 110 may increment the loop count value in an increment of "1" or any other suitable increment size.

At 31, the software component 110 may determine whether the loop count value exceeds a threshold value. For instance, the threshold value may correspond to a time frame associated with the allocated amount of bits. In some examples, the threshold value may correspond to a preset value determined by a network administrator. For instance, the threshold value may correspond to a preset value that, when reached, may cause the system to perform a rekeying process. In some examples, the preset value may correspond to a time frame, where expiration of the time frame causes the rekeying process to be performed.

Where the software component 110 determines the loop count value does not exceed the threshold value (314—NO), the process may return to step 304. As noted above, at step 304, the software component 110 may set the PN value back to an initial value (e.g., equal to "1"). Accordingly, the software component 110 may initially update the PN value in a first memory of the hardware to a specialized value that (1) is based on the loop count value being odd or even and (2) prevents the PN value from expiring (e.g., hitting 4 billion, resulting in a IV being reused, etc.). The loop count value may then be incremented in a second memory of the hardware (e.g., the SCI). The PN value may then be reset to "1" for the new "loop".

Where the software component 110 determines the loop count value does exceed the threshold value (312—YES), the process may proceed to step 314. At 314, the software component 110 may perform a rekeying process. The rekeying process may correspond to any known rekeying process utilized by tunnel security protocols.

In this way, the system may update the hardware of a network device to utilize the upper portion of bits to be incremented. However, as the lower portion of bits associated with the PN value and the upper portion of bits associated with the SCI are generally stored in different pieces of hardware, both portions of bits may not be able to be updated at the same time. Accordingly, the software component may determine when the PN value is reaching a point where the upper and lower portions may need to be updated and, change the PN value to a specialized value, update the upper portion of the bits, and then reset the lower portion of bits to the initial value. By doing so, the system ensures that the max PN value (e.g., 4 billion) is not reached, such that the system will not use the same IVs to encrypt different packets. Thus, the system ensures IV uniqueness. Moreover, the techniques described in FIGS. 2 and 3 may be implemented and may require very little synchronization between network devices (e.g., such as a RX engine and TX engine) outside of the initial session setup stage to enable masking off the high 48 bits for SCI in SA lookup programming.

Moreover, by utilizing the remaining 48-n bits for the loop count, the system may exponentially extend the rekeying windows for multi-source and multi-destination environments. As an example, and not by way of limitation, with existing techniques, a network device that operates in non-XPN mode may correspond to a 100G engine. In this example, where the 100G engine utilizes a tunnel security protocol, such as CLOUDSEC, the rekeying window may be as short as 57 seconds. In another example, with a 400G engine, the rekeying window may be as short as 14 seconds. In contrast to the existing techniques, the system described herein may extend the rekeying window. For example, with the 100G engine, where the system allocates 16 bits for the identifier, 32 bits may be utilized for the loop count. Thus, in this example, the rekeying window may equate to thousand(s) of years (instead of 57 seconds). Moreover, the software component 110 may be configured to update the loop count independently at each network device (e.g., each security engine), without considering other network device's (e.g., other security engine's) loop count state. This enables fewer resources to be used across the network and by the network device(s).

Figure 4:
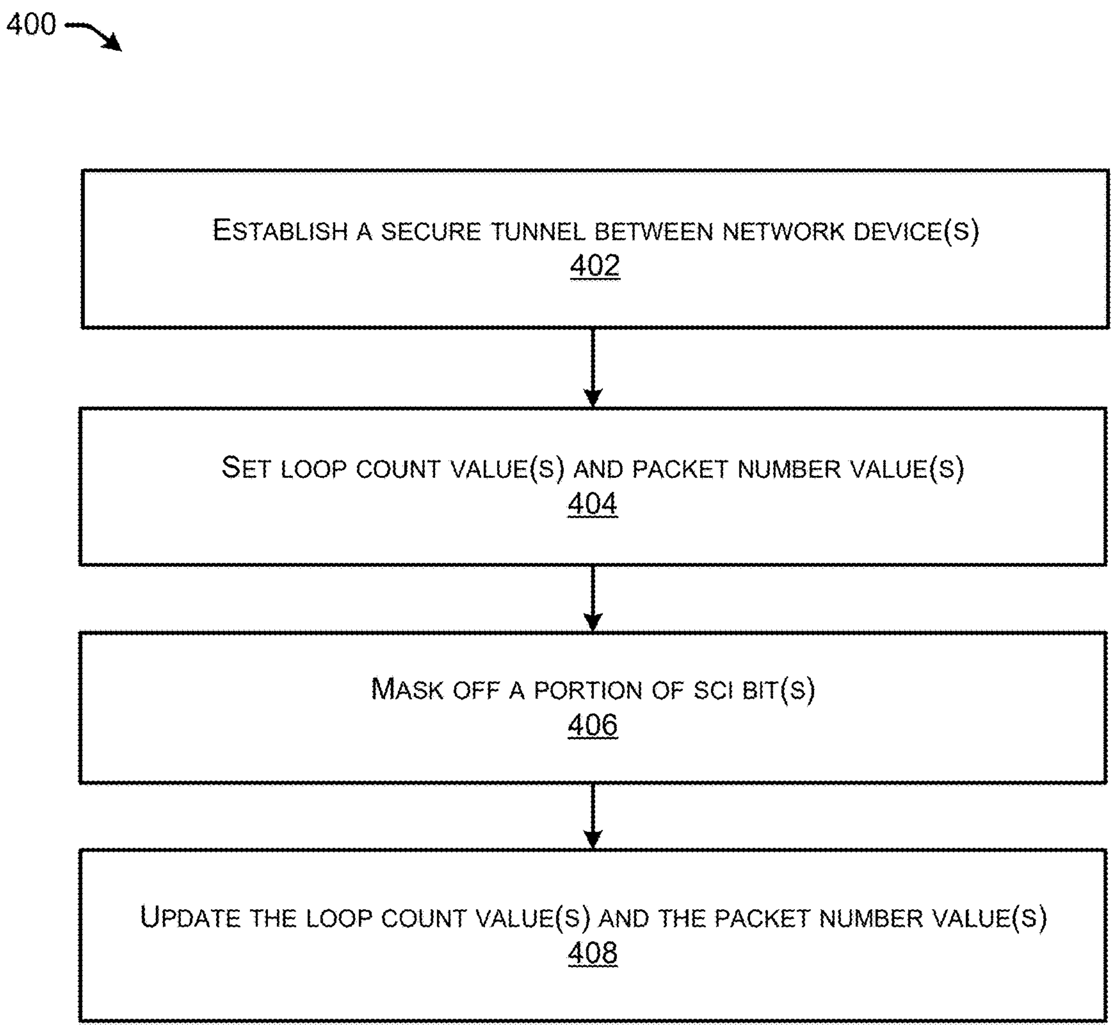
FIG. 4 illustrates a flow diagram of an example method for providing IV uniqueness and extending secure association rekeying windows associated with the system described in FIGS. 1-3.

FIG. 4 illustrates a flow diagram of an example system 400 for providing IV uniqueness and extending secure association rekeying windows associated with the system described in FIGS. 1-3. In some instances, one or more of the steps of system 400 may be performed by one or more devices (e.g., network device(s) 106, etc.) that include one or more processors and one or more non-transitory computer-readable media storing computer-executable instructions that, when executed by the one or more processors, cause the one or more processors to perform operations of system 400.

At 402, the system may establish a secure tunnel between network device(s). For instance, the system may establish a secure tunnel with a security engine within the network. In some examples, the network comprises a multi-source and multi-destination network, such as a DCI network or cloud network. In some examples, the secure tunnel may comprise a level 2 multi-source and a multi-destination tunnel.

In some examples, the network device comprises a security engine, such as a transmitter security engine or a receiver security engine. In some examples, the network device may receive packets via the secure tunnel, the packets comprising an engine identifier of the security engine.

In some examples, the system may cause the network device to operate in a non-XPN mode, wherein a SC bit is enabled in a packet header to carry additional bits as an SCI value, wherein the additional bits comprise the identifier associated with the security engine. In some examples, the additional bits comprise up to 64 bits, a lower portion of the up to 64 bits comprises a sorted SCI value. In some examples, the upper portion of bits comprises 48 bits, and wherein a first portion of the 48 bits comprise the identifier and a second portion of the 48 bits are used for the loop count value.

At 404, the system may set loop count value(s) and packet number value(s). For instance, the system may set the loop count value to a first initial value (e.g., such as zero) in a first memory of the hardware (e.g., such as the SCI value). The system may set the PN value to a second initial value (e.g., such as "1") in a second memory of the hardware, such as a packet counter hardware. In some examples, the loop count value is stored in a second memory, the first memory corresponding to a packet count memory in hardware of the network device and the second memory corresponding to an SCI memory of the hardware. In some examples, a transmitter security engine may set the initial loop count value(s) and/or packet number value(s).

At 406, the system may mask a portion of bits included in packet header(s). For instance, the system may mask the upper portion of bits in the first memory using hardware component 108. In some examples, a lower portion of bits is used to identify a SA session between the network device and the security engine. In some examples, masking may be performed by a hardware component 108. For instance, the masking may include setting the upper portion of SCI bits to a "don't care" value, such that when a receiving security engine performs a secure session lookup, the receiving engine may repurpose the upper portion of the SCI bits and identify the SA session using the lower portion of the SCI bits.

At 408, the system may update the loop count value(s) and the packet number value(s). For instance, the system may update the packet number value(s) in response to receiving packet(s) via the secure tunnel. The system may update the packet number value(s) automatically in hardware. The system may update the loop count value(s) in the first memory based on performing a process. For instance, the process may be performed by the software component 110. The process may include determining that the packet number value is greater than a threshold value; updating, based on the determining, the packet number value to a specialized value; incrementing, based on updating the packet number, the loop count value; and setting, based on incrementing the loop count value, the packet number value to the first initial value.

In some examples, determining that the packet number value exceeds the threshold value is based on one of: receiving a notification from hardware of the network device when the packet number value equals or is greater than the threshold value; or determining, at a fixed time interval, that the packet number value is greater than the threshold value.

In this way, the system may provide a way to extend rekeying windows, ensure IV uniqueness in multi-source and multi-destination environments. That is, in contrast to existing techniques, which may require updates or changes to hardware on the network devices and/or tunnel security protocols, the techniques described herein can be applied to existing network devices and utilize existing hardware and security tunnel protocols of network devices. By utilizing the non-XPN mode with the SC bit enabled, the system can enable the security tunnel protocol to carry extra bits in the SCI value. These extra bits used such that the lower 16 bits stores the SSCI value and the upper 48 bits can be partitioned and used to extend the rekeying window and ensure IV uniqueness. For instance, the instant techniques may prevent rekeying from being needed in a SA session altogether and/or greatly reduce the frequency that rekeying occurs. Further, by masking the upper 48 bits in the SCI, the system can ensure that only the lower 16 bits are used to identify a SA session. Accordingly, in contrast to existing techniques, masking in hardware and updating of loop count values and packet numbers can occur simultaneously, improving the operation of the network devices.

Figure 5:
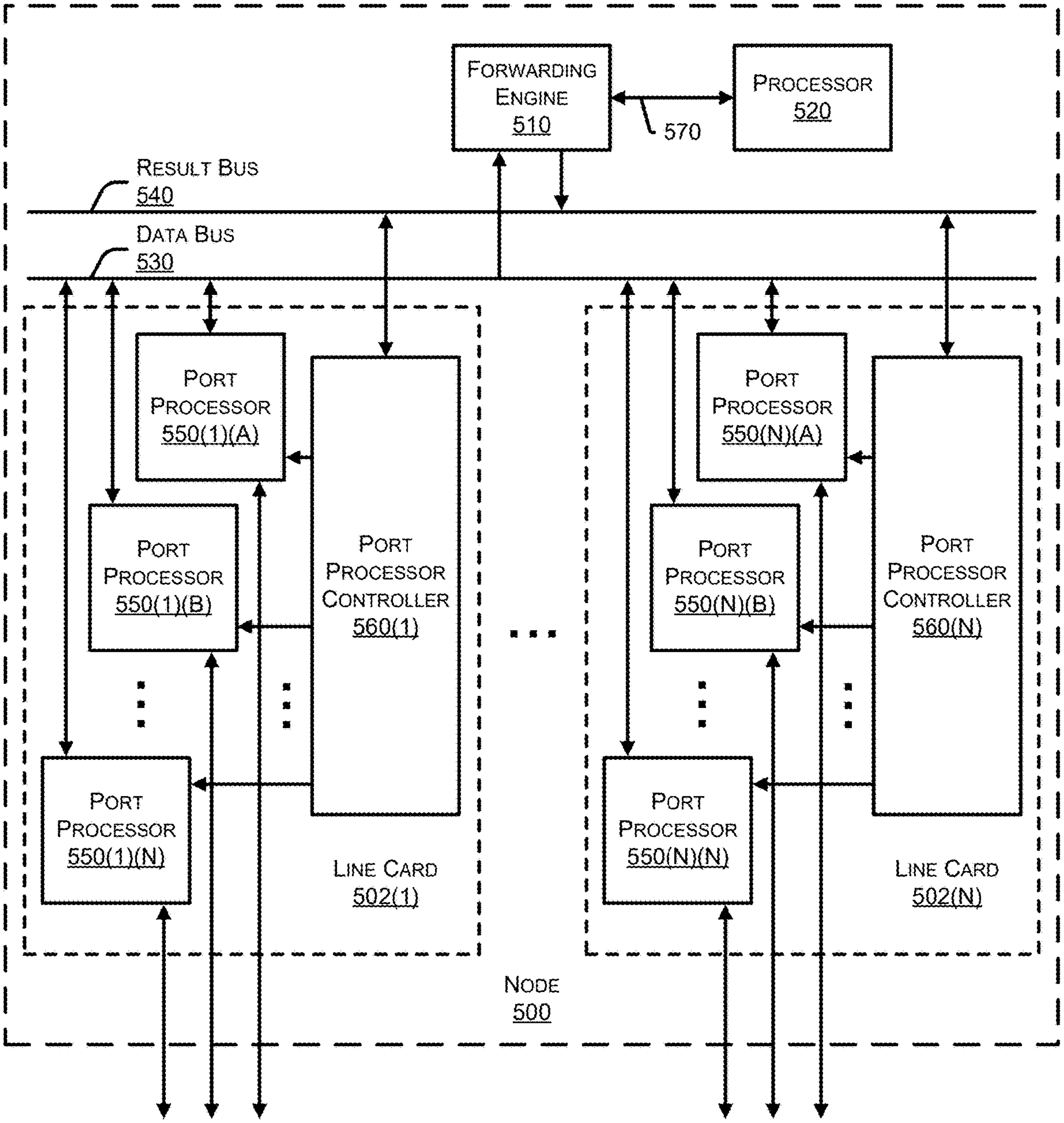
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example, network(s) 102 as described with respect to FIGS. 1-4.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550(1)(A)-(N)(N) and/or the port processor controller(s) 560(1)-(N)) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560(1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or maty add packet security information in order to secure the packet. On a node 500 sourcing such a packet or packet and header, this processing may include, for example, encryption of some or all of the packet's or packet and header's information, the addition of a digital signature, and/or some other information and/or processing capable of securing the packet or packet and header. On a node 500 receiving such a processed packet or packet and header, the corresponding process may be performed to recover or validate the packet's or packet and header's information that has been secured.

Figure 6:
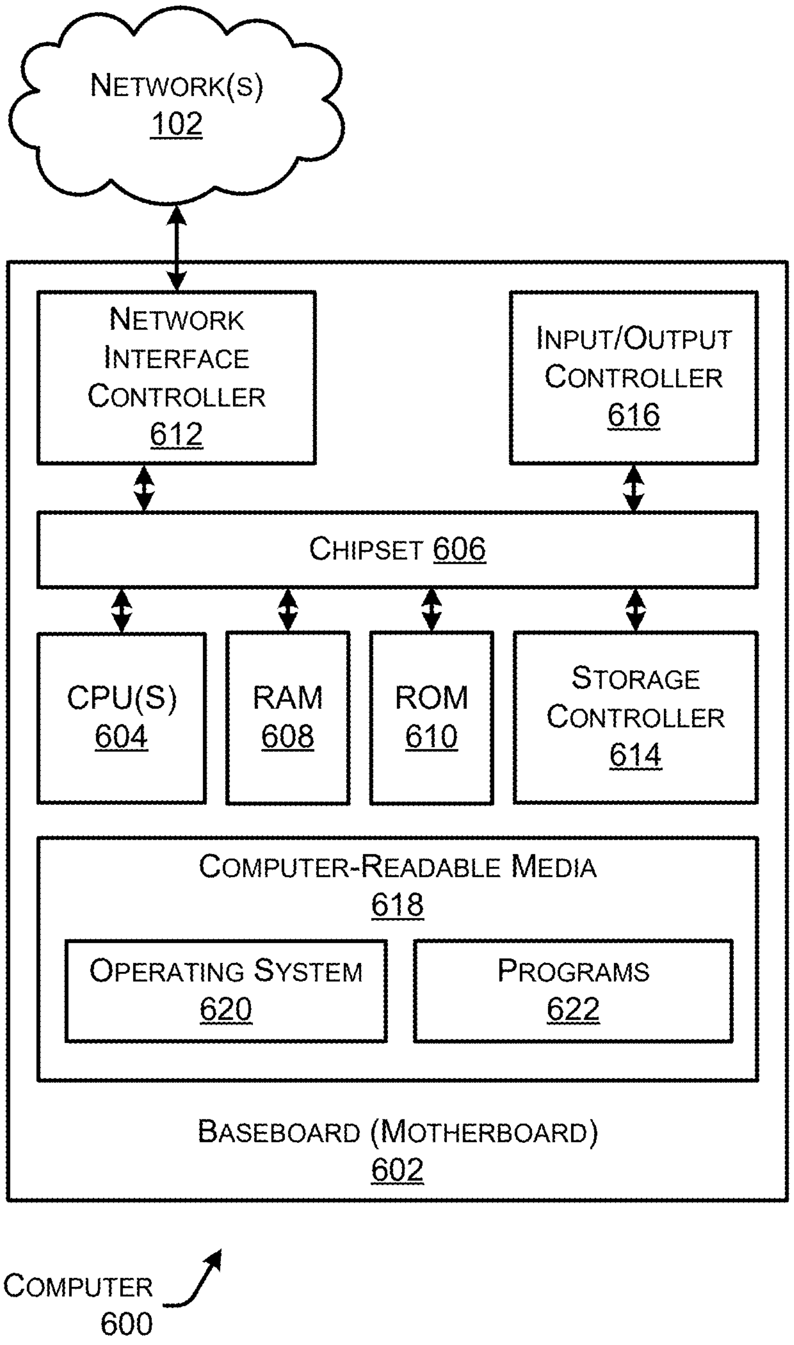
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer 600 may, in some examples, correspond to a network device 106, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network(s) 102. The chipset 606 can include functionality for providing network connectivity through a NIC 612, such as a gigabit Ethernet adapter. The NIC 612 is capable of connecting the computer 600 to other computing devices over the network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network device 106, and/or any components included therein, may be supported by one or more devices similar to computer 600. Stated otherwise, some or all of the operations performed by the network device 106, and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-4. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a network device 106, and/or any other device. The computer 600 may include one or more hardware processors (processors) configured to execute one or more stored instructions. The processor(s) may comprise one or more cores. Further, the computer 600 may include one or more network interfaces configured to provide communications between the computer 600 and other devices, such as the communications described herein as being performed by the network device 106, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure. For instance, the programs 622 may cause the computer 600 to perform techniques for facilitating dynamic and flexible programmability of processing network protocol packets. In some examples, the techniques may be implemented by one or more network device(s). In some examples, the techniques may include establishing a secure tunnel with a security engine in the network, wherein the network device receives packets via the secure tunnel, the packets comprising an identifier of the security engine; setting, based on establishing the secure tunnel, a loop count value to a first initial value and a packet number value to a second initial value; masking, based on the identifier and in a first memory, an upper portion of bits in packet headers of the packets; and updating the loop count value in the first memory based at least in part on: determining that the packet number value is greater than a threshold value; updating, based on the determining, the packet number value to a specialized value; incrementing, based on updating the packet number, the loop count value; and setting, based on incrementing the loop count value, the packet number value to the first initial value.

In this way, the computer 600 may provide a way to extend rekeying windows, ensure IV uniqueness in multi-source and multi-destination environments. That is, in contrast to existing techniques, which may require updates or changes to hardware on the network devices and/or tunnel security protocols, the techniques described herein can be applied to existing network devices and utilize existing hardware and security tunnel protocols of network devices. By utilizing the non-XPN mode with the SC bit enabled, the system can enable the security tunnel protocol to carry extra bits in the SCI value. These extra bits used such that the lower 16 bits stores the SSCI value and the upper 48 bits can be partitioned and used to extend the rekeying window and ensure IV uniqueness. For instance, the instant techniques may prevent rekeying from being needed in a SA session altogether and/or greatly reduce the frequency that rekeying occurs. Further, by masking the upper 48 bits in the SCI, the system can ensure that only the lower 16 bits are used to identify a SA session. Accordingly, in contrast to existing techniques, masking in hardware and updating of loop count values and packet numbers can occur simultaneously, improving the operation of the network devices.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a network device in a network, the method comprising:

establishing a secure tunnel with a security engine in the network, wherein the network device receives packets via the secure tunnel, the packets comprising an identifier of the security engine;

causing the network device to operate in a non-XPN mode, wherein a secure channel (SC) bit is enabled in a packet header to carry additional bits as a secure channel identifier (SCI) value, wherein the additional bits comprise the identifier associated with the security engine, setting, based on establishing the secure tunnel, a loop count value to a first initial value and a packet number value to a second initial value;

masking, based on the identifier and in a first memory, an upper portion of bits in packet headers of the packets; and updating the loop count value in the first memory based at least in part on:

determining that the packet number value is greater than a threshold value;

updating, based on the determining, the packet number value to a specialized value;

incrementing, based on updating the packet number value, the loop count value; and setting, based on incrementing the loop count value, the packet number value to the first initial value.

2. The method of claim 1, wherein the secure tunnel comprises a layer multi-source and a multi-destination tunnel.

3. The method of claim 1, wherein the network is implemented in a multi-source and multi-destination environment.

4. The method of claim 1, wherein the network device comprises a second security engine.

5. The method of claim 1, wherein the additional bits comprise up to 64 bits, a lower portion of the up to 64 bits comprises a sorted SCI value.

6. The method of claim 1, wherein the upper portion of bits comprises 48 bits, and wherein a first portion of the 48 bits comprise the identifier and a second portion of the 48 bits are used for the loop count value.

7. The method of claim 1, wherein determining that the packet number value exceeds the threshold value is based on one of:

receiving a notification from hardware of the network device when the packet number value equals or is greater than the threshold value; or determining, at a fixed time interval, that the packet number value is greater than the threshold value.

8. The method of claim 1, wherein the loop count value is stored in a second memory, the first memory corresponding to a packet count memory in hardware of the network device and the second memory corresponding to an SCI memory of the hardware.

9. The method of claim 1, wherein a lower portion of bits is used to identify a SA session between the network device and the security engine.

10. A system comprising:

one or more processors; and one or more computer-readable media storing instructions that, when executed by the one or more processors, cause the one or more processors to perform operations comprising:

establishing a secure tunnel between a network device and a security engine in a network, wherein the network device receives packets via the secure tunnel, the packets comprising an identifier of the security engine;

setting, based on establishing the secure tunnel, a loop count value to a first initial value and a packet number value to a second initial value;

masking, based on the identifier and in a first memory, an upper portion of bits in packet headers of the packets, wherein the loop count value is stored in a second memory, the first memory corresponding to a packet count memory in hardware of the network device and the second memory corresponding to a SCI memory of the hardware; and updating the loop count value in the first memory based at least in part on:

determining that the packet number value is greater than a threshold value;

updating, based on the determining, the packet number value to a specialized value;

incrementing, based on updating the packet number value, the loop count value; and setting, based on incrementing the loop count value, the packet number value to the first initial value.

11. The system of claim 10, wherein the secure tunnel comprises a layer multi-source and a multi-destination tunnel.

12. The system of claim 10, wherein determining that the packet number value exceeds the threshold value is based on one of:

receiving a notification from hardware of the network device when the packet number value equals or is greater than the threshold value; or determining, at a fixed time interval, that the packet number value is greater than the threshold value.

13. The system of claim 10, wherein the network is implemented in a multi-source and multi-destination environment.

14. The system of claim 10, wherein the network device comprises a second security engine.

15. The system of claim 10, the operations further comprising:

causing the network device to operate in a non-XPN mode, wherein a SC bit is enabled in a packet header to carry additional bits as an SCI value, wherein the additional bits comprise the identifier associated with the security engine.

16. The system of claim 15, wherein the additional bits comprise up to 64 bits, a lower portion of the up to 64 bits comprises a sorted SCI value.

17. The system of claim 15, wherein the upper portion of bits comprises 48 bits, and wherein a first portion of the 48 bits comprise the identifier and a second portion of the 48 bits are used for the loop count value.

18. One or more non-transitory computer-readable media maintaining instructions that, when executed by one or more processors of a network device, program the one or more processors to perform operations comprising:

establishing a secure tunnel with a security engine in a network, wherein the network device receives packets via the secure tunnel, the packets comprising an identifier of the security engine;

causing the network device to operate in a non-XPN mode, wherein a secure channel (SC) bit is enabled in a packet header to carry additional bits as a secure channel identifier (SCI) value, wherein the additional bits comprise the identifier associated with the security engine, setting, based on establishing the secure tunnel, a loop count value to a first initial value and a packet number value to a second initial value;

masking, based on the identifier and in a first memory, an upper portion of bits in packet headers of the packets; and updating the loop count value in the first memory based at least in part on:

determining that the packet number value is greater than a threshold value;

updating, based on the determining, the packet number value to a specialized value;

incrementing, based on updating the packet number value, the loop count value; and setting, based on incrementing the loop count value, the packet number value to the first initial value.

* * * * *